No. 882,406. PATENTED MAR. 17, 1908.
B. J. MORGAN.
AUTOMATIC COUPLING FOR AIR BRAKE SYSTEMS.
APPLICATION FILED MAR. 16, 1907.
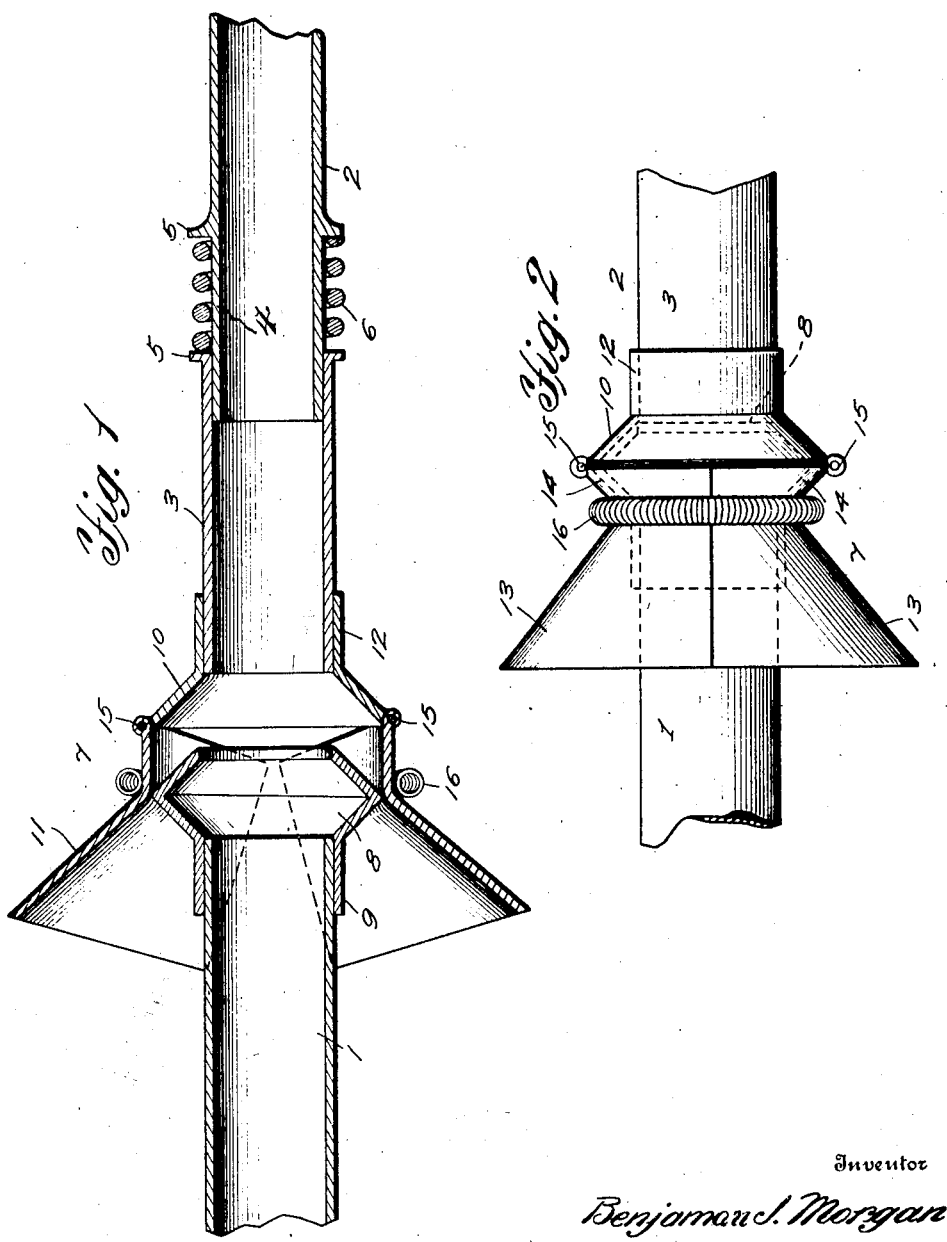
Inventor
Benjamin J. Morgan
By Victor J. Evans
Attorney
Witnesses
R. C. Claflin
C. Bradway

UNITED STATES PATENT OFFICE.

BENJAMAN J. MORGAN, OF BEVIER, MISSOURI.

AUTOMATIC COUPLING FOR AIR-BRAKE SYSTEMS.

No. 882,406.  Specification of Letters Patent.  Patented March 17, 1908.

Application filed March 16, 1907. Serial No. 362,671.

*To all whom it may concern:*

Be it known that I, BENJAMAN J. MORGAN, a citizen of the United States, residing at Bevier, in the county of Macon and State of Missouri, have invented new and useful Improvements in Automatic Couplings for Air-Brake Systems, of which the following is a specification.

This invention relates to automatic couplers designed more particularly for use in connection with air brake systems whereby the train pipes on the cars are automatically coupled or uncoupled as the cars are connected or disconnected, thus relieving the brakemen of the difficult and sometimes dangerous operation of connecting train pipes together.

The invention has for one of its objects to improve and simplify the construction and operation of devices of this character so as to make them comparatively easy and inexpensive to manufacture and keep in repair, while they are composed of few parts and are highly efficient and reliable in use.

A further object of the invention is the provision of an automatic coupling composed of a suitably shaped head on one of the train pipes, and spring-pressed members on the adjacent end of the other train pipe which is adapted to be automatically expanded by the entrance of the head and automatically contracted and engaged around the head to hold the latter in position.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a central longitudinal section of the automatic air pipe coupling showing the parts in the act of connecting or disconnecting. Fig. 2 is a side elevation showing the parts coupled together.

Similar reference character are employed to designate similar parts throughout the views.

Referring to the drawing, 1 and 2 designate the adjacent ends of two air pipes or other conduits adapted to be coupled together. The pipe 2 is composed of two telescoping members 3 and 4 having abutments in the form of annular flanges 5 forming seats for the opposite ends of a helical compression spring 6 encircling the section 4. By this means, the section 2 includes a cushioning device for absorbing the shocks incident to the pipes or sections 1 and 2 being connected. The coupling designated generally by 7 comprises a head 8 formed on a sleeve 9 that is rigidly secured on the pipe 1 and a seat 10 on the pipe 2 that is provided with hinged members 11 adapted to embrace the head and hold it in engagement with the seat. The head 8 is in the form of a double frustum of a cone and the seat 10 is frusto-conical and provided with a collar 12 that encircles the section 3 of the pipe 2 to which it is rigidly secured. The embracing members 11 are formed to constitute a funnel composed of two sections divisible on an axial plane and the inner ends of the sections 13 flare outwardly at 14 to engage behind the head 8 when the latter is seated. The flaring portions 14 are hinged at 15 to the member 10 and encircling the members 11 is a garter spring 16 whereby the two semi-funnel shaped sections 13 can swing outwardly as the sections of the coupling are pulled apart or assembled, as in the uncoupling or coupling of the cars on which the pipes 1 and 2 are mounted.

From the foregoing description, taken in connection with the accompanying drawing, the advantages of the construction and of the method of operation will be readily understood by those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims.

Having thus described the invention, what I claim is:—

1. In an automatic coupler, the combination of a pair of conduits, a head fixedly secured on the extremity of one of the conduits, a fixed seat on the other conduit shaped to receive the head, a pair of members hinged to the seat at diametrically opposite points and arranged to swing on parallel axes, said members being in the form of frustums of a cone connected and flaring in opposite directions, and an endless spring surrounding the members for yieldingly holding the latter together.

2. In an automatic coupler, the combination of a pair of conduits, a head on one of the conduits, a seat on the other, outwardly movable means adapted to be engaged by the head as the conduits are coupled and uncoupled and arranged to yieldingly hold the head against the seat, and an elastic means arranged in coöperative relation with the first-mentioned means and held in place by its elasticity.

3. In an automatic coupler, the combination of a head, a seat, hinged members connected with the seat and having oppositely extending flaring portions forming a mouth for receiving the head and for holding the head against the seat, and a device surrounding the hinged portions and held in place thereon by the oppositely flaring portions.

4. In an automatic coupler, the combination of a pair of conduits, a head on one of the conduits, a seat on the other conduit, semi-funnel shaped members movably connected with the seat and arranged to be engaged by the head during the coupling operation and to hold the head against the seat, and an elastic annular member extending around the outside of the first-mentioned members to yieldingly hold them in position.

In testimony whereof, I affix my signature in presence of two witnesses.

BENJAMAN J. MORGAN.

Witnesses:
GEO. R. SMITH,
CHAS. EDMUNDS.